United States Patent Office 3,557,141

Patented Jan. 19, 1971

3,557,141

2-PHENYL-3-TERTIARYAMINO-1-(2-THIENYL)-1-PROPANONES

Robert Bruce Moffett, Kalamazoo, Mich., assignor to The Upjohn Company, Kalamazoo, Mich., a corporation of Delaware No Drawing. Filed July 25, 1968, Ser. No. 747,428
Int. Cl. C07d *63/10*
U.S. Cl. 260—326.5 3 Claims

ABSTRACT OF THE DISCLOSURE

This invention relates to novel 2-phenyl-3-tertiary-amino-1-(2-thienyl)-1-propanones; it is inclusive of the free base and acid addition salt forms of the componds embraced by the formula

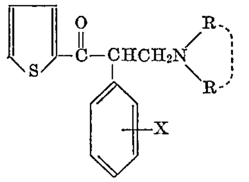

(I)

wherein

is selected from the group consisting of 1-pyrrolidinyl lower-alkyl-1 - pyrrolidinyl di-lower-alkyl-1-pyrrolidinyl, piperidino, lower - alkylpiperidino, di-lower - alkylpiperidino, and di-lower-alkylamino, and X is selected from the group consisting of hydrogen, lower-alkyl, fluorine, chlorine and bromine.

As used in this specification, the term "lower-alkyl" means alkyl of from one through four carbon atoms, e.g., methyl, ethyl, propyl, butyl, and isomeric forms thereof.

CROSS REFERENCE TO RELATED APPLICATIONS

Ser. No. 747,450 filed of even date covering novel 2 - phenyl-3-(3-azabicyclo[3.2.2]nonan - 3 - yl) - propiophenones and 2-phenyl-3-(2-azabicyclo[2.2.2]octan-2-yl)-propiophenones.

Ser. No. 747,482 filed of even date covering 2-phenyl-3-(1-azaspiro[4.5]dec-1-yl)-propiophenones.

Ser. No. 747,426 filed of even date covering 2-phenyl-3-(3-quinuclidinylamino)-propiophenones.

Ser. No. 747,425 filed of even date covering 2-phenyl-3-(4-hydroxy-4-phenylpiperidino)-propiophenones.

Ser. No. 747,483 filed of even date covering 2-phenyl-3-(3-pyrrolin-1-yl)-propiophenones.

BRIEF SUMMARY OF THE INVENTION

The novel 2-phenyl-3-tertiaryamino - 1-(2 - thieyl)-1-propanones of Formula I exist either in the non-protonated (free base) form or in the protonated (acid addition salt) form, depending on the pH of the environment. They form stable protonates, i.e., acid addition salts, on neutralization of the free base with suitable acids, for example, hydrochloric, hydrobromic, sulfuric, phosphoric, nitric, acetic, benzoic, salicyclic, glycolic, succinic, nocotinic, tartaric, maleic, malic, pamoic, methanesulfonic, cyclohexanesulfamic, picric, and lactic acids, and the like.

The novel 2 - phenyl-3-tertiaryamino-1-(2-thienyl)-1-propanones of Formula I are prepared by conventional known methods, e.g., by reacting a benzyl 2-thienyl ketone of the formula

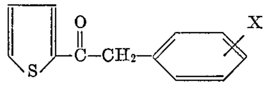

(II)

wherein X has the same meaning as above, with an appropriate secondary amine of the formula

(III)

wherein

has the significance defined hereinbefore, in the presence of formaldehyde or a reactive derivative thereof.

Benzyl 2-thienyl ketones (II) are known in the art; they can be prepared by reacting thiophene with a phenylacetyl chloride in the manner described in J. Amer. Chem. Soc., 75, 1115 (1953), and in Collective Volume II, p. 8, of "Organic Syntheses," John Wiley and Sons, Inc., New York, N.Y., 1943.

The secondary amines of Formula III are well known in the art and a wide variety of them have been prepared by known methods; at considerable number are commercially available. Among the known secondary amines (III) that can be employed in the above process are pyrrolidine, 2-methylpyrrolidine, 3-ethylpyrrolidine, 3-isopropylpyrrolidine, 2,4-dimethylpyrrolidine, 2,5-diethylpyrrolidine, piperidine, 2-ethylpiperidine, 3-butylpiperidine, 2,4-dipropylpiperidine, 4-methylpiperidine, diethylamine, ethylpropylamine, dipropylamine, and the like.

Reactive derivatives of formaldehyde are those furnishing formaldehyde under the conditions of the reaction, e.g. paraformaldehyde, trioxane, hexamethylenetetramine, and the like.

A compound of Formula I is prepared by the above reaction between a benzyl 2-thienyl ketone (II) and a secondary amine (III) in the presence of formaldehyde or a reactive derivative thereof, in accordance with the procedure known as the Mannich reaction, concerning which there exists an extensive literature (e.g., see the review article by F. F. Blicke in "Organic Reactions," vol. I, pp. 303–341, John Wiley and Sons, Inc., New York, N.Y., 1942). The reaction is preferably carried out in the presence of an inert solvent such as a lower-alkanol, e.g., methanol or ethanol, preferably at room temperature, but temperatures between about +10° C. and about 150° C. are suitable. The molecular ratios of the compounds of Formula II and Formula III can be varied, molar ratios of about 1:1 to about 1:2 being satisfactory. The time required for the completion of the reaction depends upon such factors as the reaction temperature, the particular reactants employed, the relative amounts of reactants, thoroughness of mixing, and the like. Therefore, it will be understood that the optimum reaction time will vary for each set of reaction conditions. Ordinarily, reaction times ranging from about 1 to about 24 hours are suitable. After completion of the reaction, the products (I) are recovered in their free base form from the basified reaction mixture by conventional procedures such as filtration, solvent evaporation, solvent extraction, chromatography or crystallization, or a combination of these methods. Each of the free bases thus obtained can be purified, e.g., by recrystallization from a suitable solvent or mixture of solvents. The free base can be converted to any desired acid addition salt by neutralization with an acid, e.g., any of those given above.

The novel compounds of Formula I, in their free base form in the form of their acid addition salts with pharmacologically acceptable acids, e.g., any of those given above, exhibit pharmacological activity. The compounds of Formula I possess central nervous system stimulating, alertness increasing- anti-agressive behavior, and antitremor activities, and are useful in arresting or alleviating central nervous system depression, increasing alertness, arresting or decreasing aggression and tremor in mammals and animals, e.g., mice, rate and birds (e.g., poultry).

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

PREPARATION 1

Benzyl 2-thienyl ketone (II)

A solution of 168 g. (2 moles) of thiophene and 308 g. (2 moles) of phenylacetyl chloride in 2 l. of benzene is cooled to 0° C. and 230 ml. (520 g., 2 moles) of stannic chloride added dropwise at from about −2° C. to about +3° C. during the course of about 1 hour. The mixture is allowed to warm to room temperature, stirred for about 1.5 hours, and hydrolyzed by the addition of 900 ml. of water and 100 ml. of concentrated hydrochloric acid. The aqueous layer is separated and extracted with ether. The benzene and ether solutions are washed first with water, then saturated sodium chloride solution, and dried over calcium chloride. After filtration and removal of the solvent the product is distilled to give 70 g. of material having a boiling point of 171 to 180° C./15 mm. Hg and which solidifies in the receiver; much viscous residue remains in the still. The distillate, containing much phenylacetic acid, is dissolved in ether, washed with dilute sodium hydroxide solution, then water, and dried over sodium sulfate. Filtration and evaporation of the solvent in vacuo gives 29.1 g. of brown oil which soon crystallizes. This is recrystallized from 2-propanol to give 18 g. of light tan crystalline benzyl 2-thienyl ketone (II), having a melting point of 49 to 50° C.

Following the procedure of Preparation 1, but substituting for phenylacetyl chloride the following:

(1) p-bromophenylacetyl chloride,
(2) o-chlorophenylacetyl chloride,
(3) m-chlorophenylacetyl chloride,
(4) p-fluorophenylacetyl chloride,
(5) o-methylphenylacetyl chloride,
(6) m-ethylphenylacetyl chloride,
(7) p-propylphenylacetyl chloride, etc., there can be prepared, respectively, (1) p-bromobenzyl 2-thienyl ketone (II),
(2) o-chlorobenzyl 2-thienyl ketone (II),
(3) m-chlorobenzyl 2-thienyl ketone (II),
(4) p-fluorobenzyl 2-thienyl ketone (II),
(5) o-methylbenzyl 2-thienyl ketone (II),
(6) m-ethylbenzyl 2-thienyl ketone (II),
(7) p-propylbenzyl 2-thienyl ketone (II), etc.

EXAMPLE 1

2-phenyl-3-(1-pyrrolidinyl)-1-(2-thienyl)-1-propane (I)

To a mixture of 18 g. (0.089 mole) of benzyl 2-thienyl ketone (II), 10.7 ml. of 37% formaldehyde, and 75 ml. of methanol, 8.5 ml. (0.109 mole) of pyrrolidine (III) is slowly added. The mixture becomes warm and the solid dissolves. Crystals separate on standing and are collected after about 16 hours, washed with 2-propanol and dried to give 28.4 g. of 2-phenyl-3-(1-pyrrolidinyl)-1-(2-thienyl)-1-propanone (I), having a melting point of 119.5 to 121° C.

*Analysis.*—Calcd. for $C_{17}H_{19}NOS$ (percent): C, 71.54; H, 6.71; N, 4.91; S, 11.23. Found (percent): C, 71.86; H, 6.77; N, 5.17; S, 11.28.

Following the procedure of Example 1, but substituting for benzyl 2-thienyl ketone (II) the following:

(1) p-brombenzyl 2-thienyl ketone (II),
(2) o-chlorobenzyl 2-thienyl ketone (II),
(3) m-chlorobenzyl 2-thienyl ketone (II),
(4) p-fluorobenzyl 2-thienyl ketone (II),
(5) o-methylbenzyl 2-thienyl ketone (II),
(6) m-ethylbenzyl 2-thienyl ketone (II),
(7) p-propylbenzyl 2-thienyl ketone (II), etc., there can be prepared, respectively, (1) 2-(p-bromophenyl(-3-(1-pyrrolidinyl)-1-(2-thienyl)-1-propanone (I),
(2) 2-(o-chlorophenyl)-3-(1-pyrrolidinyl)-1-(2-thienyl)-1-propanone (I),
(3) 2-(m-chlorophenyl)-3-(1-pyrrolidinyl)-1-(2-thienyl)-1-propanone(1),
(4) 2-(p-fluorophenyl)-3-(1-pyrrolidinyl)-1-(2-thienyl)-1-propanone (I),
(5) 2-(o-methylphenyl)-3-(1-pyrrolidinyl)-1-(2-thienyl)-1-propanone (I),
(6) 2-(m-ethylphenyl)-3-(1-pyrrolidinyl)-1-(2-thienyl)-1-propanone (I),
(7) 2-(p-propylenyl)-3-(1-pyrrolidinyl)-1-(2-thienyl)-1-propanone (I), etc.

Following the procedure of Example 1, but substituting for pyrrolidine (III) the following:

(1) 2-methylpyrrolidine (III),
(2) 3-propylpyrrolidine (III),
(3) 3-butylpyrrolidine (III),
(4) 2,2-dimethylpyrrolidine (III),
(5) 2,4-diethylpyrrolidine (III),
(6) 3,4-dibutylpyrrolidine (III),
(7) piperidine (III),
(8) 2-methylpiperidine (III),
(9) 3-propylpiperidine (III),
(10) 2,6-dimethylpiperidine (III),
(11) 2,5-dibutylpiperidine (III),
(12) dimethylamine (III),
(13) diethylamine (III),
(14) diisobutylamine (III),
(15) methylethylamine (III), etc., there can be prepared, respectively, (1) 2-phenyl-3-(2-methyl-1-pyrrolidinyl)-1-(2-thienyl)-1-propanone (I),
(2) 2-phenyl-3-(3-propyl-1-pyrrolidinyl)-1-(2-thienyl)-1-propanone (I),
(3) 2-phenyl-3-(3-butyl-1-pyrrolidinyl)-1-(2-thienyl)-1-propanone (I),
(4) 2-phenyl-3-(2,2-dimethyl-1-pyrrolidinyl)-1-(2-thienyl)-1-propanone (I),
(5) 2-phenyl-3-(2,4-diethyl-1-pyrrolidinyl)-1-(2-thienyl)-1-propanone (I),
(6) 2-phenyl-3-(3,4-dibutyl-1-pyrrolidinyl)-1-(2-thienyl)-1-propanone (I),
(7) 2-phenyl-3-piperidino-1-(2-thienyl)-1-propanone (I),
(8) 2-phenyl-3-(2-methylpiperidino)-1-(2-thienyl)-1-propanone (I),
(9) 2-phenyl-3-(3-propylpiperidino)-1-(2-thienyl)-1-propanone (I),
(10) 2-phenyl-3-(2,6-dimethylpiperidino)-1-(2-thienyl)-1-propanone (I),
(11) 2-phenyl-3-(2,5-dibutylpiperidino)-1-(2-thienyl)-1-propanone (I),
(12) 2-phenyl-3-dimethylamino-1-(2-thienyl)-1-propanone (I),
(13) 2-phenyl-3-diethylamino-1-(2-thienyl)-1-propanone (I),

(14) 2-phenyl-3-diisobutylamino-1-(2-thienyl)-1-propanone (I),
(15) 2-phenyl-3-methylethylamino-1-(2-thienyl)-1-propanone (I), etc.

Following the procedure of Example 1, but substituting for benzyl 2-thienyl ketone (II) and pyrrolidine (III) the following:

(1) p-bromobenzyl 2-thienyl ketone (II) and 2-methylpyrrolidine (III),
(2) o-chlorobenzyl 2-thienyl ketone (II) and 2,4-diethylpyrrolidine (III),
(3) m-chlorobenzyl 2-thienyl ketone (II) and piperidine (III),
(4) p-fluorobenzyl 2-thienyl ketone (II) and 2-methylpiperidine (III),
(5) o-methylbenzyl 2-thienyl ketone (II) and 2,6-dimethylpiperidine (III),
(6) m-ethylbenzyl 2-thienyl ketone (II) and dimethylamine (III),
(7) p-propylbenzyl 2-thienyl ketone (II) and diisobutylamine (III), etc., these can be prepared, respectively, (1) 2-(p-bromophenyl)-3-(2-methyl-1-pyrrolidinyl)-1-(2-thienyl)-1-propanone (I),
(2) 2-(o-chlorophenyl)-3-(2,4-diethyl-1-pyrrolidinyl)-1-(2-thienyl)-1-propanone (I),
(3) 2-(m-chlorophenyl)-3-piperidino-1-(2-thienyl)-1-propanone (I),
(4) 2-(p-fluorophenyl)-3-(2-methylpiperidino)-1-(2-thienyl)-1-propanone (I),
(5) 2-(o-methylphenyl)-3-(2,6-dimethylpiperidino)-1-(2-thienyl)-1-propanone (I),
(6) 2-(m-ethylphenyl)-3-dimethylamino-1-(2-thienyl)-1-propanone (I),
(7) 2-(p-propylphenyl)-3-diisobutylamino-1-(2-thienyl)-1-propanone (I), etc.

EXAMPLE 2

2-phenyl-3-(1-pyrrolidinyl)-1-(2-thienyl)-1-propanone hydrochloride (I)

The free base form of the product (I) obtained in Example 1 is dissolved in 3.5 l. of absolute ether and acidified with ethanolic hydrogen chloride to give 30.7 g. of solid having a melting point of 168 to 170° C. (with decomposition). This is recrystallized from 200 ml. of 2-propanol to yield 28.6 g. of crystalline 2-phenyl-3-(1-pyrrolidinyl)-1-(2-thienyl)-1-propane hydrochloride (I) melting at 168 to 170° C.

*Analysis.*—Calcd. for $C_{17}H_{20}ClNOS$ (percent): C, 63.43; H, 6.26; Cl, 11.02; N, 4.35; S, 9.96. Found (percent): C, 63.28; H, 6.55; Cl, 10.57; N, 4.19; S, 10.57.

On neutralization of the thus obtained hydrochloride (I) with sodium or potassium hydroxide, the free base form, 2-phenyl-3-(1-pyrrolidinyl)-1-(2-thienyl)-1-propanone (I) is produced.

Following the procedure of Example 2, but substituting for hydrogen chloride another acid, e.g., hydrobromic, sulfuric, phosphoric, acetic, benzoic, salicylic, citric, succinic, malic, cyclohexanesulfamic, etc., the corresponding acid addition salt of 2-phenyl-3-(1-pyrrolidinyl)-1-(2-thienyl)-1-propanone (I) can be prepared.

Following the procedures of the immediately preceding paragraph and of Example 2, but substituting for the free base form of 2-phenyl-3-(1-pyrrolidinyl)-1-(2-thienyl)-1-propanone (I) other compounds embraced by Formula I, such as those designated (1) through (7) in the paragraph directly above Example 2, their corresponding acid addition salts can be prepared.

Modes of administration and dosages of the products of Formula I of this invention for use as central nervous system stimulants are analogous to those disclosed in U.S. Pat. 3,203,962.

What is claimed is:

1. A compound selected from the group consisting of (1) a compound of the formula

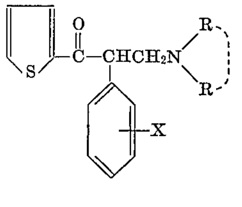

wherein

is selected from the group consisting of 1-pyrrolidinyl, lower-alkyl-1-pyrrolidinyl, di-lower-alkyl-1-pyrrolidinyl, piperidino, lower-alkylpiperidino, di-lower-alkylpiperidino, and di-lower-alkylamino, X is selected from the group consisting of hydrogen, lower-alkyl, fluorine, chlorine and bromine, and (2) a pharmaceutically acceptable acid addition salt thereof.

2. A compound of claim 1 wherein

is 1-pyrrolidinyl and X is hydrogen, namely, 2-phenyl-3-(1-pyrrolidinyl)-1-(2-thienyl)-1-propanone.

3. An acid addition salt of a compound of claim 1 wherein

is 1-pyrrolidinyl, X is hydrogen and the acid addition salt is that of hydrogen chloride, namely, 2-phenyl-3-(1-pyrrolidinyl)-1-(2-thienyl)-1-propanone hydrochloride.

References Cited

UNITED STATES PATENTS

| | | | |
|---|---|---|---|
| 3,189,600 | 6/1965 | Huebner | 260—326.5X |
| 3,372,162 | 3/1968 | Pesson et al. | 260—326.5X |

NICHOLAS S. RIZZO, Primary Examiner

J. A. NARCAVAGE, Assistant Examiner

U.S. Cl. X.R.

260—293.4, 332.3, 999